June 19, 1923.
C. W. CARPER
HARROW
Filed Sept. 6, 1921
1,459,571
2 Sheets-Sheet 1
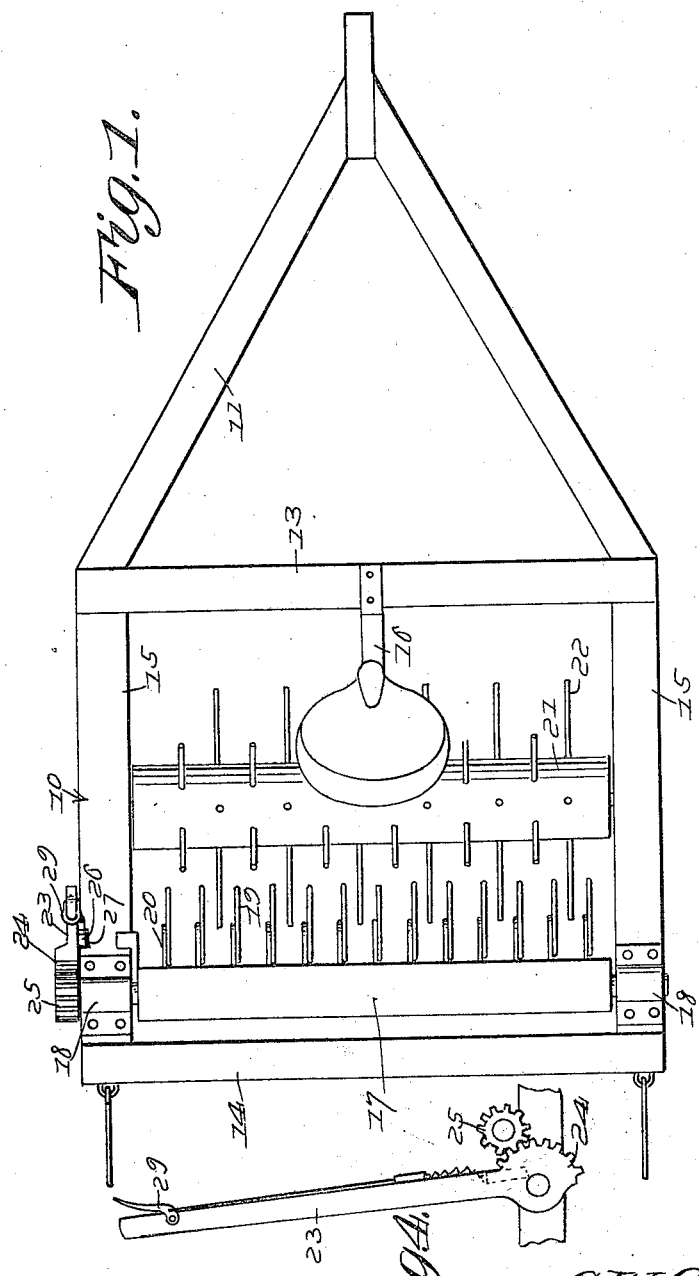

June 19, 1923.
C. W. CARPER
HARROW
Filed Sept. 6, 1921
1,459,571
2 Sheets-Sheet 2
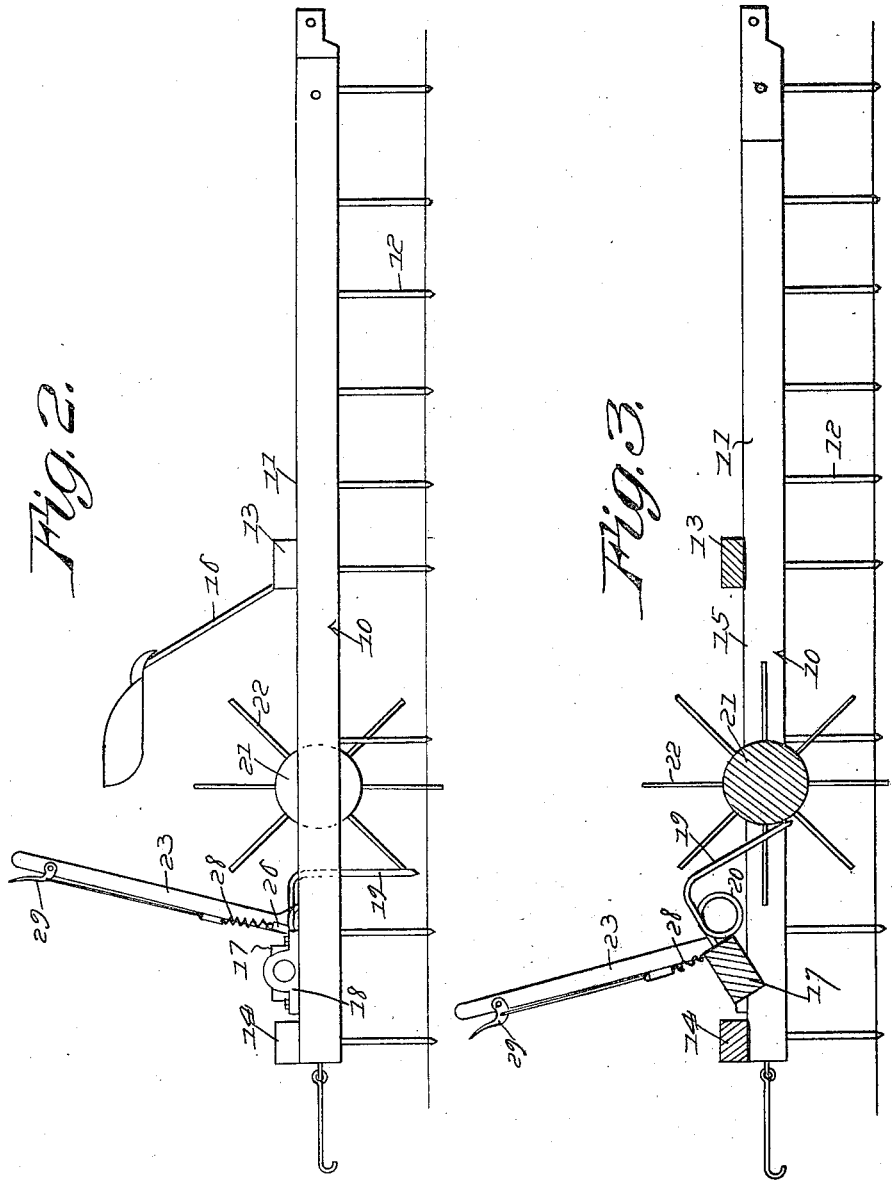
Inventor
C. W. Carper,
By
Attorney Patented June 19, 1923.

1,459,571

UNITED STATES PATENT OFFICE.

CHARLES W. CARPER, OF AMMA, WEST VIRGINIA.

HARROW.

Application filed September 6, 1921. Serial No. 498,642.

*To all whom it may concern:*

Be it known that CHARLES W. CARPER, a citizen of the United States of America, residing at Amma, in the county of Roane and State of West Virginia, has invented new and useful Improvements in Harrows, of which the following is a specification.

The object of the invention is to provide a simple and efficient apparatus designed especially for breaking up sodded or grass grown land in preparation for seeding and more especially to provide a device for the purpose whereby the sod is effectually broken up or reduced in the operation without clogging or interfering with the movement of the implement; and with these objects in view the invention consists in a construction and combination of parts of which a preferred embodiment is shown in the accompanying drawings, wherein:—

Figure 1 is a plan view of an apparatus embodying the invention.

Figure 2 is a side view of the same.

Figure 3 is a longitudinal section of the same showing in full lines the tilted position of the rake head.

Figure 4 is a detail view of the operating lever by which the position of the rocker is controlled.

The apparatus embodies essentially a substantially horizontal frame 10 which is tapered toward its front end to form a harrow element 11 carrying the harrow teeth 12 which serve to tear up the sod in the progress of the machine which may be either horse or tractor drawn, the portion of the frame in rear of the harrow element being transversely braced as shown at 13 and 14 and having the substantially parallel side beams 15, on the forward of the cross bars 13 being mounted a seat supporting standard 16.

Carried by the main portion of the frame adjacent to the rear end thereof is a rake element having a head consisting of a rocker 17 of which the trunnions are mounted in bearings 18 on the side beams and which carries the rake teeth 19 provided with spring coils 20, while mounted in advance of the rake head is a rotary toothed drum 21 of which the teeth or spurs 22 engage the soil and aid in loosening and tearing up the sod and which also pass between the teeth of the rake head and by moving upwardly with relation thereto serve to tear the clogs of sod and weeds into small portions or in other words to reduce the same so as to keep the rake teeth substantially clear and leave the soil in a proper condition for seeding, the vegetation being practically destroyed and left on the surface.

In order to move the rake teeth out of operative position either for cleaning the same or when the operation thereof is not required an operating hand lever 23 is pivotally mounted on one of the side beams of the body portion of the frame and is provided with a segment 24 for engaging a pinion 25 on one of the trunnions of the rocker, said lever carrying a locking bolt or pawl 26 adapted for engagement with a socket 27 to secure the rocker in its normal or operative position, and a spring 28 serving to connect said pawl or bolt with a trip lever 29 mounted on the hand lever.

Furthermore in order to provide for the attachment of a trailer in the event that further manipulation of the soil is desired or that the seeding mechanism may act in immediate sequence to the harrow, draft hooks 30 are connected with the rear ends of the side beams.

Having described the invention, what is claimed as new and useful is:—

1. An agricultural implement for breaking grass-grown land having a harrow element, a rake element following the harrow element, and a spurred drum disposed between the harrow element and the rake element, the rake element consisting of a rocker having its extremities reduced to provide journals and mounted in bearings on the implement frame, and rake teeth secured to the rocker and provided with spring coils adjacent the rocker, the rocker being provided with means for imparting angular movement to it to elevate and lower the teeth.

2. An agricultural implement for breaking grass-grown land having a harrow element, a rake element following the harrow element, and a spurred drum disposed between the harrow element and the rake element, the rake element consisting of a rocker having its extremities reduced to provide journals and mounted in bearings on the implement frame, and rake teeth secured to the rocker and provided with spring coils adjacent the rocker, the rocker being provided with means for imparting angular movement to it to elevate and lower the teeth, said means comprising a hand lever pivotally mounted on the implement frame and formed with a toothed segment concentric with the pivot point, a pinion mounted on one of the journals of the rocker outside of the bearing thereof, and a latch for the lever to provide for locking it in adjusted position to maintain the break teeth elevated or lowered into operative position.

In testimony whereof he affixes his signature.

CHARLES W. CARPER.